(12) United States Patent
Zhao

(10) Patent No.: US 10,347,201 B2
(45) Date of Patent: Jul. 9, 2019

(54) CONTROL DEVICE OF DISPLAY PANEL AND CONTROL METHOD

(71) Applicant: Shenzhen China Star Optoelectronics Technology Co., Ltd., Shenzhen, Guangdong (CN)

(72) Inventor: Wenqin Zhao, Guangdong (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 286 days.

(21) Appl. No.: 15/034,783

(22) PCT Filed: Jan. 7, 2016

(86) PCT No.: PCT/CN2016/070346
§ 371 (c)(1),
(2) Date: May 5, 2016

(87) PCT Pub. No.: WO2017/088290
PCT Pub. Date: Jun. 1, 2017

(65) Prior Publication Data
US 2018/0096661 A1  Apr. 5, 2018

(30) Foreign Application Priority Data
Nov. 25, 2015 (CN) .......................... 2015 1 0833824

(51) Int. Cl.
*G09G 3/36* (2006.01)
*G09G 5/00* (2006.01)
*G02F 1/1333* (2006.01)

(52) U.S. Cl.
CPC ......... *G09G 3/3614* (2013.01); *G02F 1/1333* (2013.01); *G09G 3/3648* (2013.01);
(Continued)

(58) Field of Classification Search
CPC .... G09G 3/3614; G09G 3/3648; G09G 5/001; G02F 1/1333
See application file for complete search history.

(56) References Cited

U.S. PATENT DOCUMENTS 7,446,489 B2 * 11/2008 Jang .................... H05B 41/2828
                                                          315/118
9,183,800 B2 * 11/2015 Fu ......................... G09G 3/3614
(Continued)

FOREIGN PATENT DOCUMENTS

CN         1677474 A      10/2005
CN         1896813 A       1/2007
(Continued)

*Primary Examiner* — Afroza Chowdhury
(74) *Attorney, Agent, or Firm* — Andrew C. Cheng

(57) ABSTRACT

The embodiment of the present invention discloses a control device of a display panel and a control method, wherein the control method of the display panel comprises: detecting a temperature of a chip of a source driver of the display panel, and to generate a notification signal according to the temperature; obtaining a temperature of the notification signal, and generating a control signal according to the temperature if the temperature exceeds preset temperature range thresholds; switching a polarity inversion manner of the display panel according to the control signal. The present invention adjusts the power consumption of the display panel by adjusting the polarity inversion manner so that the display panel can work with the proper power consumption. Thus, the chip of the source driver can be ensured to be in the normal work temperature range to guarantee the normal operation of the display panel and decrease of the failure.

12 Claims, 3 Drawing Sheets

(52) U.S. Cl.
CPC ....... *G09G 5/001* (2013.01); *G09G 2330/021* (2013.01); *G09G 2330/045* (2013.01)

(56) References Cited

U.S. PATENT DOCUMENTS

| | | | | |
|---|---|---|---|---|
| 2004/0109122 | A1* | 6/2004 | Kumagawa | G02F 1/134363 349/143 |
| 2007/0008274 | A1* | 1/2007 | Nakanishi | G09G 5/001 345/101 |
| 2007/0070003 | A1 | 3/2007 | Nakamura et al. | |
| 2009/0289965 | A1* | 11/2009 | Kurokawa | G09G 3/3406 345/690 |
| 2011/0316823 | A1* | 12/2011 | Otani | G09G 3/3688 345/204 |
| 2013/0169615 | A1* | 7/2013 | Kobayashi | G09G 3/36 345/212 |

FOREIGN PATENT DOCUMENTS

| | | |
|---|---|---|
| CN | 103293731 A | 9/2013 |
| CN | 103354084 A | 10/2013 |
| CN | 104282276 A | 1/2015 |

\* cited by examiner

FIG. 2

CONTROL DEVICE OF DISPLAY PANEL AND CONTROL METHOD

CROSS REFERENCE

This application claims the priority of Chinese Patent Application No. 201510833824.1, entitled "Control device of display panel and control method", filed on Nov. 25, 2015, the disclosure of which is incorporated herein by reference in its entirety.

FIELD OF THE INVENTION

The present invention relates to a display technology field, and more particularly to a control device of a display panel and a control method.

BACKGROUND OF THE INVENTION

The liquid crystal displays possess many merits of small volume, low power consumption and irradiation free and have been widely used, such as in the liquid crystal TV, smart phone screen, tablet computer or computer screen, and dominates the flat panel display field.

Now, the requirements for the display results of the liquid crystal displays become higher and higher. The products of high resolution, high color gamut, high contrast, high refresh rate become popular. With the introduction of these technologies, the power consumption of the liquid crystal display gets higher and higher. Particularly, in the state of high resolution, the over large current of some specific image can result in the over large power consumption. Consequently, the temperature of the liquid crystal display is too high and cannot normally work.

SUMMARY OF THE INVENTION

The embodiment of the present invention provides a control device of a display panel and a control method, which can prevent that the display cannot normally work due to the excessive temperature.

For solving the aforesaid technical issues, first, the embodiment of the present invention provides a control device of a display panel, comprising a sequence controller and a source driver, and the control device further comprises:

a temperature detection module, employed to detect a temperature of a chip of the source driver, and to generate a notification signal according to the temperature, and to send the notification signal to the sequence controller;

the sequence controller is employed to obtain the temperature indicated by the notification signal, and to generate a control signal according to the temperature, and to send the control signal to the source driver if the temperature exceeds preset temperature range thresholds;

the source driver is employed to switch a polarity inversion manner of the display panel according to the control signal.

Preferably, the preset temperature range thresholds comprises a first temperature threshold and a second temperature threshold, and the first temperature threshold is higher than the second temperature threshold, and that the temperature exceeds the preset temperature range threshold comprises that the temperature is higher than the first temperature threshold and that the temperature is lower than the second temperature threshold.

Preferably, if the temperature is higher than the first temperature threshold, the sequence controller generates a first control signal according to the temperature;

the source driver switches the polarity inversion manner of the display panel according to the first control signal, wherein a power consumption of the polarity inversion manner after switching is lower than a power consumption of the polarity inversion manner before switching.

Preferably, if the temperature is lower than the second temperature threshold, the sequence controller generates a second control signal according to the temperature;

the source driver switches the polarity inversion manner of the display panel according to the second control signal, wherein a power consumption of the polarity inversion manner after switching is higher than a power consumption of the polarity inversion manner before switching.

Preferably, the polarity inversion manner comprises frame inversion, column inversion, row inversion, two row inversion and dot inversion.

Preferably, the temperature detection module employs a thermal resistor to detect the temperature of the chip of the source driver.

Preferably, the notification signal is a voltage signal.

Preferably, the sequence controller analyzes the notification signal to obtain the temperature indicated by the voltage signal in the notification signal.

Second, the embodiment of the present invention provides a control method of a display panel, comprising:

detecting a temperature of a chip of a source driver of the display panel, and to generate a notification signal according to the temperature;

obtaining a temperature of the notification signal, and generating a control signal according to the temperature if the temperature exceeds preset temperature range thresholds;

switching a polarity inversion manner of the display panel according to the control signal.

Preferably, the preset temperature range thresholds comprises a first temperature threshold and a second temperature threshold, and the first temperature threshold is higher than the second temperature threshold, and that the temperature exceeds the preset temperature range threshold comprises that the temperature is higher than the first temperature threshold and that the temperature is lower than the second temperature threshold.

Preferably, if the temperature is higher than the first temperature threshold, the sequence controller generates a first control signal according to the temperature;

switching the polarity inversion manner of the display panel according to the first control signal, wherein a power consumption of the polarity inversion manner after switching is lower than a power consumption of the polarity inversion manner before switching.

Preferably, if the temperature is lower than the second temperature threshold, the sequence controller generates a second control signal according to the temperature;

switching the polarity inversion manner of the display panel according to the second control signal, wherein a power consumption of the polarity inversion manner after switching is higher than a power consumption of the polarity inversion manner before switching.

Preferably, the polarity inversion manner comprises frame inversion, column inversion, row inversion, two row inversion and dot inversion.

Preferably, detecting the temperature of the chip of the source driver of the display panel comprises:

employing a thermal resistor to detect the temperature of the chip of the source driver of the display panel.

Preferably, the notification signal is a voltage signal.

Preferably, obtaining the temperature of the notification signal comprises:

analyzing the notification signal to obtain the temperature indicated by the voltage signal in the notification signal.

The embodiment of the present invention has benefits below:

The present invention adjusts the polarity inversion manner of the display panel as the temperature exceeds the preset thresholds with detecting the temperature of the chip of the source driver, and adjusts the power consumption of the display panel by adjusting the polarity inversion manner so that the display panel can work with the proper power consumption. Thus, the chip of the source driver can be ensured to be in the normal work temperature range to guarantee the normal operation of the display panel and decrease of the failure.

BRIEF DESCRIPTION OF THE DRAWINGS

In order to more clearly illustrate the embodiments of the present invention, the following figures will be described in the embodiments are briefly introduced. It is obvious that the drawings are only some embodiments of the present invention, those of ordinary skill in this field can obtain other figures according to these figures without paying the premise.

FIG. 2 is a diagram of the polarity inversion manner in the embodiment of the present invention.

DETAILED DESCRIPTION OF PREFERRED EMBODIMENTS

Embodiments of the present invention are described in detail with the technical matters, structural features, achieved objects, and effects with reference to the accompanying drawings as follows. It is clear that the described embodiments are part of embodiments of the present invention, but not all embodiments. Based on the embodiments of the present invention, all other embodiments to those of ordinary skill in the premise of no creative efforts obtained, should be considered within the scope of protection of the present invention.

The terminologies "first", "second" and "third" in the specification, claims and aforesaid figures of the present invention are used for distinguishing different objects but not for describing the specific sequence. Furthermore, the terms "including" and its any deformations are intended to cover non-exclusive inclusion. For example, a process, a method, a system, a product or a device comprising a series of steps or units which is not limited to the steps or units already listed, but optionally further comprises steps or units which are not listed, or optionally further comprises other steps or units which are inherent in these the process, the method, the product or the device.

Figure 1:
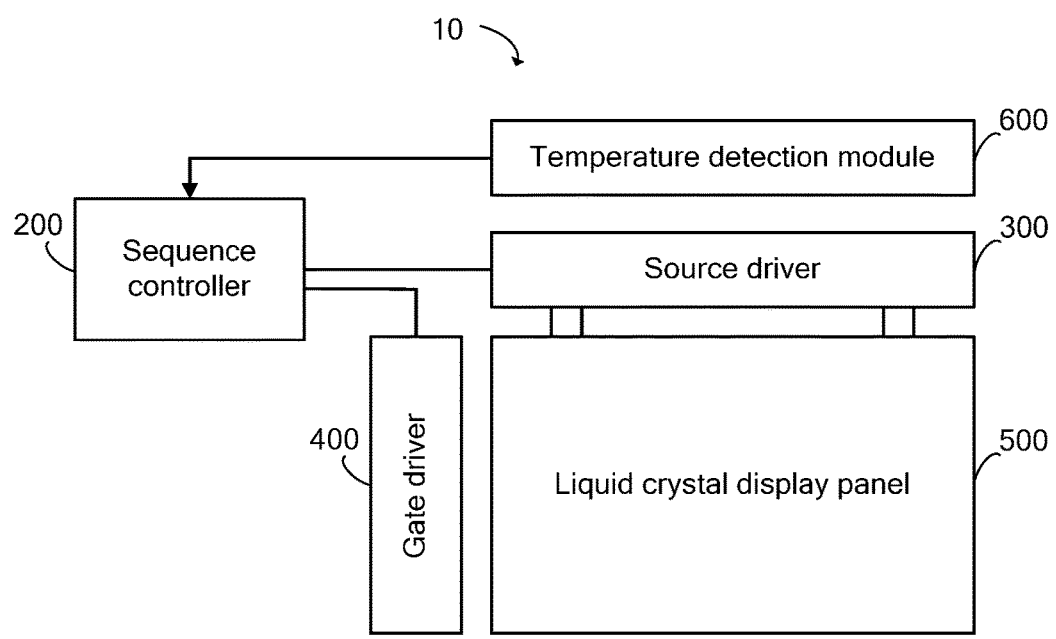
FIG. 1 is a structure diagram of a control device of a display panel provided by the embodiment of the present invention.

FIG. 1 shows a structure diagram of a control device of a display panel provided by the embodiment of the present invention. As shown in FIG. 1, the control device 10 of the display panel comprises a sequence controller 200, a source driver 300 and a gate driver 400, wherein the source driver 300 and the gate driver 400 are respectively coupled to the liquid crystal display panel 500, and the sequence controller 200 is electrically coupled to the source driver 300 and the gate driver 400, respectively.

The sequence controller 200 is employed to provide necessary sequence control signals for the source driver 300 and the gate driver 400. The sequence controller 200 receives the low voltage differential signals transmitted by the front end, and after the signal is converted, the liquid crystal display panel 500 is driven by outputting the corresponding sequence control signals to make each pixel dot shows the corresponding pixel voltage. The sequence control signal outputted by the sequence controller 200 comprises: the frame image start signal, the gate driving clock signal, the source driving data source row latch signal and the polarity inversion signal.

In this embodiment, the control device further comprises a temperature detection module 600. The temperature detection module 600 is electrically coupled to the source driver 300 and the sequence controller 200, respectively. It is understood that the temperature detection module 600 can be integrated on the source driver 300. This embodiment is not restricted thereto.

The temperature detection module 600 is employed to detect a temperature of a chip of the source driver 300, and to generate a notification signal according to the temperature, and to send the notification signal to the sequence controller 200. Specifically, the temperature detection module 600 employs a thermal resistor to detect the temperature of the chip of the source driver 300, and generates the notification signal, wherein the notification signal is a voltage signal.

The sequence controller 200 is employed to obtain the temperature indicated by the notification signal, and to generate a control signal according to the temperature, and to send the control signal to the source driver 300 if the temperature exceeds preset temperature range thresholds. Specifically, the sequence controller 200 receives the notification signal sent by the temperature detection module 600, and analyzes the notification signal to obtain the temperature indicated by the voltage signal in the notification signal for determining whether the temperature exceeds the preset temperature range thresholds, wherein that the temperature exceeds the preset temperature range threshold comprises the highest value of the temperature range thresholds and the lowest value of the temperature range thresholds. If the temperature exceeds the preset temperature range threshold, it indicates that the work temperature of the source driver is not normal. If the corresponding adjustment is not executed, it can lead to that the liquid crystal display panel cannot normally work. Therefore, the control signal is generated according to the temperature, and the control signal is sent to the source driver 300. The skilled person in this art should understand that there are many reasons that the temperature exceeds the preset temperature range threshold, such as the higher resolution is utilized and the power consumption is too high; or the ambient temperature is too high or too low. The embodiment has not restriction thereto.

The source driver 300 is employed to switch a polarity inversion manner of the display panel according to the control signal. Specifically, the control signal is a polarity inversion control signal, and the source driver 300 switches the polarity inversion manner of the display panel according to the control signal. The power consumptions of different polarity inversions are different. Thus, the power consumption can be changed by switching to the different polarity inversion to adjust the temperature. As the present temperature of the source driver 300 is too high, the power consumption can be reduced to lower the temperature by switching to the polarity inversion with lower power consumption; as the present temperature of the source driver 300 is too low, the power consumption can be increased to raise the temperature by switching to the polarity inversion with high power consumption. With the aforesaid arrangement, the temperature of the source driver can be maintained in a reasonable range to guarantee the normal operation of the display panel and decrease of the failure.

As aforementioned, the control device of the display panel in the embodiment of the present invention adjusts the polarity inversion manner of the display panel as the temperature exceeds the preset range with detecting the temperature of the chip of the source driver, and adjusts the power consumption of the display panel by adjusting the polarity inversion manner so that the display panel can work with the proper power consumption. Thus, the chip of the source driver can be ensured to be in the normal work temperature range to guarantee the normal operation of the display panel and decrease of the failure.

Specifically, the polarity inversion manner comprises frame inversion, column inversion, row inversion, two row inversion and dot inversion. For preventing the DC blocking effect and the transmission of the DC residue, the liquid crystal of all the pixels in the liquid crystal display panel have to be driven with the polarity inversion manner. For the pixel array, the pixels which are adjacent in the array do not have to be driven with the same polarity. Thus, the different polarity inversions can be applied to the adjacent pixels, and there are many kinds of polarity inversions.

Figure 2:
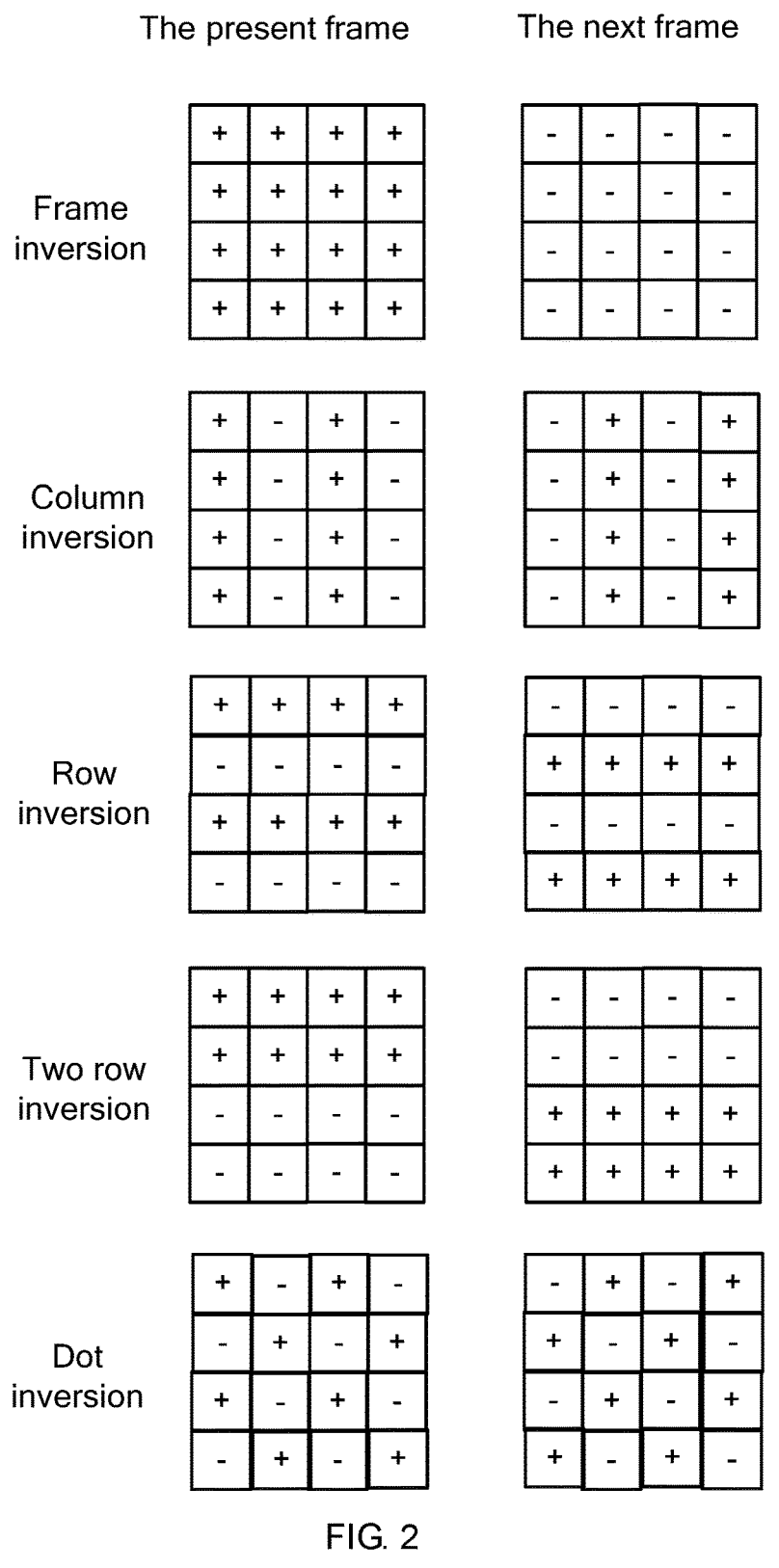

FIG. 2 shows a diagram of the polarity inversion manner in the embodiment of the present invention. As shown in figure, the left column in FIG. 2 are the voltage polarities of the present frame in kinds of inversions, and the right column are the voltage polarities of the next frame in kinds of inversions. Each row of FIG. 2 shows the voltage polarities of the present frame and the next frame in one kind of inversion. According to the different voltage polarities of all the pixels in each frame, kinds of inversion can be illustrated. As shown in the first row of FIG. 2, the voltage polarities stored by the pixels of the present frame are the same, and it is the frame inversion, and correspondingly, the voltage polarities stored by the pixels of the next frame will be opposite to these of the present frame; as shown in the second row of FIG. 2, the voltage polarities stored by the pixels of the same column of the present frame are the same, and the voltage polarities stored by the pixels of the left, right adjacent columns are opposite, it is the column inversion; as shown in the third row of FIG. 2, the voltage polarities stored by the pixels of the same row of the present frame are the same, and the voltage polarities stored by the pixels of the upper, lower adjacent rows are opposite, it is the row inversion; as shown in the fourth row of FIG. 2, the voltage polarities stored by the pixels of the same two rows of the present frame are the same, and the voltage polarities stored by the pixels of the upper, lower adjacent two rows are opposite, it is the two row inversion; as shown in the fifth row of FIG. 2, the voltage polarity stored by each pixel of the present frame is opposite to the voltage polarities stored by the upper, lower, left, right adjacent pixels are opposite, it is the dot inversion. The skilled person in this art should understand that the polarity inversion manner also can be others, and this embodiment is not restricted thereto.

Because of the frequency change relationship of the voltage, the power consumptions of the different polarity inversions are different. The relationship of the power consumptions of the respective polarity inversions is indicated: dot inversion>row inversion>two rows inversion>column inversion>frame inversion. Therefore, according to the relationship of the power consumptions of the polarity inversions, as the temperature of the source driver 300 exceeds the preset temperature threshold, the adjustment of the power consumption can be realized to maintain the temperature in the reasonable range by switching the present polarity inversion.

Specifically, as the sequence controller 200 determines whether the temperature exceeds the preset temperature range thresholds, the preset temperature range thresholds comprises a first temperature threshold and a second temperature threshold, and the first temperature threshold is higher than the second temperature threshold, and that the temperature exceeds the preset temperature range threshold comprises that the temperature is higher than the first temperature threshold and that the temperature is lower than the second temperature threshold. Because the source driver only can work in the proper temperature range, and as the temperature is too high or too low, it will result in that the source driver cannot normally work. Thus, as determining whether the temperature exceeds the temperature range threshold, it includes determining whether the temperature is too high or too low. The temperature range threshold depends on the specific structure of the liquid crystal panel. In this embodiment, the temperature range threshold can be set to be: 0-40 degree Celsius, i.e. the first temperature threshold is 40 degree Celsius, and the second temperature threshold is 0 degree Celsius. In other embodiment, the manufacture processes and structures of the liquid crystal panels are different, and the temperature range thresholds can be different. For instance, they can be −40-80 degree Celsius, i.e. the first temperature threshold is 80 degree Celsius, and the second temperature threshold is −40 degree Celsius. The embodiment has not restriction thereto.

Specifically, if the sequence controller 200 determines that the temperature is higher than the first temperature threshold, the sequence controller 200 generates a first control signal according to the temperature, and sends the first control signal to the source driver 300. That the temperature is higher than the first temperature threshold indicates that the temperature of the source driver 300 is too high, and the power consumption needs to be reduced. Therefore, after the source driver 300 receives the first control signal, it switches the polarity inversion manner of the display panel according to the first control signal, wherein a power consumption of the polarity inversion manner after switching is lower than a power consumption of the polarity inversion manner before switching. Thus reduction of the power consumption is realized to lower the temperature. The source driver 300 can switch the present polarity inversion according to the relationship of the power consumptions of the respective polarity inversions. As an illustration, if the present polarity inversion manner is the dot inversion, then it can be switched to the row inversion. In other embodiments, various levels can be set for the polarity inversion manner. The level priorities are arranged according to the values of the power consumptions. The level of the dot inversion with the highest power consumption is the highest, and the level of the frame inversion with the lowest power consumption is the lowest. As the power consumption needs to be reduced, then it is switched to the polarity inversion of one lower level.

Specifically, if the sequence controller 200 determines that the temperature is lower than the second temperature threshold, the sequence controller 200 generates a second control signal according to the temperature, and sends the second control signal to the source driver 300. That the temperature is lower than the second temperature threshold indicates that the temperature of the source driver 300 is too low, and the power consumption needs to be raised. Therefore, after the source driver 300 receives the second control signal, it switches the polarity inversion manner of the display panel according to the second control signal, wherein a power consumption of the polarity inversion manner after switching is higher than a power consumption of the polarity inversion manner before switching. Thus increase of the power consumption is realized to raise the temperature. The source driver 300 can switch the present polarity inversion according to the relationship of the power consumptions of the respective polarity inversions. As an illustration, if the present polarity inversion manner is the frame inversion, then it can be switched to the column inversion. In other embodiments, various levels can be set for the polarity inversion manner. The level priorities are arranged according to the values of the power consumptions. The level of the dot inversion with the highest power consumption is the highest, and the level of the frame inversion with the lowest power consumption is the lowest. As the power consumption needs to be raised, and then it is switched to the polarity inversion of one upper level.

As aforementioned, the control device of the display panel in the embodiment of the present invention adjusts to be the polarity inversion manner of lower power consumption as the temperature is higher than the preset threshold; adjusts to be the polarity inversion manner of higher power consumption as the temperature is lower than the preset threshold with detecting the temperature of the chip of the source driver, and adjusts the power consumption of the display panel by adjusting the polarity inversion manner so that the display panel can work with the proper power consumption. Thus, the chip of the source driver can be ensured to be in the normal work temperature range to guarantee the normal operation of the display panel and decrease of the failure.

Figure 3:
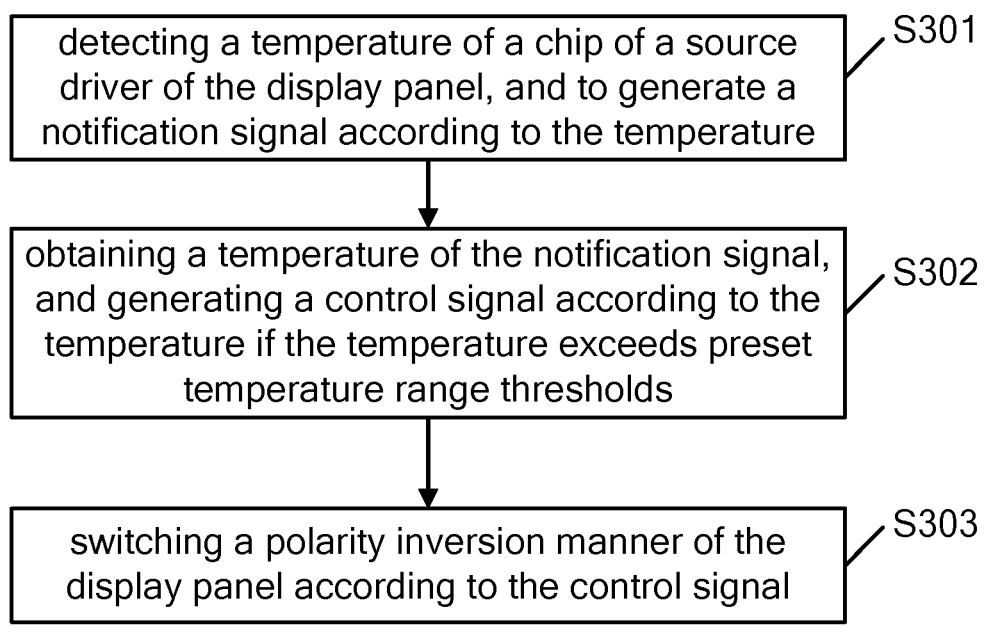
FIG. 3 is a flowchart of a control method of a display panel provided by the embodiment of the present invention.

FIG. 3 is a flowchart of a control method of a display panel provided by the embodiment of the present invention. The display panel comprises a sequence controller, a source driver and a gate driver, wherein the source driver and the gate driver are respectively coupled to the liquid crystal display panel, and the sequence controller is electrically coupled to the source driver and the gate driver, respectively. The display panel further comprises a temperature detection module, and the temperature detection module is electrically coupled to the source driver and the sequence controller, respectively. The control method of the display panel comprises the following S301-S304.

In the step S301, detecting a temperature of a chip of a source driver of the display panel, and to generate a notification signal according to the temperature.

Specifically, the temperature detection module detects a temperature of a chip of the source driver, and generates a notification signal according to the temperature, and sends the notification signal to the sequence controller. In this embodiment, the temperature detection module employs a thermal resistor to detect the temperature of the chip of the source driver, and generates the notification signal, wherein the notification signal is a voltage signal.

In the step S302, obtaining a temperature of the notification signal, and generating a control signal according to the temperature if the temperature exceeds preset temperature range thresholds.

Specifically, the sequence controller receives the notification signal sent by the temperature detection module, and analyzes the notification signal to obtain the temperature indicated by the voltage signal in the notification signal for determining whether the temperature exceeds the preset temperature range thresholds, wherein that the temperature exceeds the preset temperature range threshold comprises the highest value of the temperature range thresholds and the lowest value of the temperature range thresholds. If the temperature exceeds the preset temperature range threshold, it indicates that the work temperature of the source driver is not normal. If the corresponding adjustment is not executed, it can lead to that the liquid crystal display panel cannot normally work. Therefore, the control signal is generated according to the temperature, and the control signal is sent to the source driver.

In other embodiments, the preset temperature range thresholds comprises a first temperature threshold and a second temperature threshold, wherein the first temperature threshold is higher than the second temperature threshold, and that the temperature exceeds the preset temperature range threshold comprises that the temperature is higher than the first temperature threshold and that the temperature is lower than the second temperature threshold. Because the source driver only can work in the proper temperature range, and as the temperature is too high or too low, it will result in that the source driver cannot normally work. Thus, as determining whether the temperature exceeds the temperature range threshold, it includes determining whether the temperature is too high or too low.

If the sequence controller determines that the temperature is higher than the first temperature threshold, the sequence controller generates a first control signal according to the temperature, and sends the first control signal to the source driver.

If the sequence controller determines that the temperature is lower than the second temperature threshold, the sequence controller generates a second control signal according to the temperature, and sends the second control signal to the source driver.

In the step S303, switching a polarity inversion manner of the display panel according to the control signal.

Specifically, the control signal is a polarity inversion control signal, and the source driver switches the polarity inversion manner of the display panel according to the control signal. The power consumptions of different polarity inversions are different. Thus, the power consumption can be changed by switching to the different polarity inversion to adjust the temperature. As the present temperature of the source driver is too high, the power consumption can be reduced to lower the temperature by switching to the polarity inversion with lower power consumption; as the present temperature of the source driver is too low, the power consumption can be increased to raise the temperature by switching to the polarity inversion with high power consumption. With the aforesaid arrangement, the temperature of the source driver can be maintained in a reasonable range to guarantee the normal operation of the display panel and decrease of the failure.

Specifically, the polarity inversion manner comprises frame inversion, column inversion, row inversion, two row inversion and dot inversion. For preventing the DC blocking effect and the transmission of the DC residue, the liquid crystal of all the pixels in the liquid crystal display panel have to be driven with the polarity inversion manner. For the pixel array, the pixels which are adjacent in the array do not have to be driven with the same polarity. Thus, the different polarity inversions can be applied to the adjacent pixels, and there are many kinds of polarity inversions.

In other embodiments, after the source driver receives the first control signal, it switches the polarity inversion manner of the display panel according to the first control signal, wherein a power consumption of the polarity inversion manner after switching is lower than a power consumption of the polarity inversion manner before switching. Thus reduction of the power consumption is realized to lower the temperature.

After the source driver receives the second control signal, it switches the polarity inversion manner of the display panel according to the second control signal, wherein a power consumption of the polarity inversion manner after switching is higher than a power consumption of the polarity inversion manner before switching. Thus increase of the power consumption is realized to raise the temperature.

As aforementioned, the control method of the display panel in the embodiment of the present invention adjusts to be the polarity inversion manner of lower power consumption as the temperature is higher than the preset threshold; adjusts to be the polarity inversion manner of higher power consumption as the temperature is lower than the preset threshold with detecting the temperature of the chip of the source driver, and adjusts the power consumption of the display panel by adjusting the polarity inversion manner so that the display panel can work with the proper power consumption. Thus, the chip of the source driver can be ensured to be in the normal work temperature range to guarantee the normal operation of the display panel and decrease of the failure.

It should be noted that, for each of the aforementioned embodiments of the method, for simplifying description, it is expressed as a combination of a series of actions. Nevertheless, the skilled person in this art should understand that the present invention is not limited to the described operation sequence because some steps can be employed in other order sequentially or simultaneously according to the present invention. Secondly, those skilled persons in this art should understand that the embodiments described in the specification are all the preferred embodiments, and the involved operations and modules of the present invention should not be not essential.

In the foregoing embodiments, the description of the various embodiments have respective different emphases, and a part in some embodiment, which is not described in detail can be referred to the related description of other embodiments.

The steps in the method according to the embodiment of the present invention can be order adjusted, divided or deleted according to the actual requirements.

The modules or units in the device according to the embodiment of the present invention can be merged, divided or deleted according to the actual requirements. Those skilled persons in this art can bind or combine various embodiments and features of different embodiments described in the specification.

With the descriptions in the aforesaid embodiments, those skilled persons in this art can understand that the present invention may be achieved by implementing in hardware or firmware, or a combination thereof. When the software is used for achievement, the aforesaid function can be stored in the computer readable medium or can be one or more instructions or codes in the computer readable medium for transmission. The computer readable medium comprises the computer storage medium and communication medium, wherein the communication medium includes any mediums transmitting the computer program from one place to another place. The storage medium can be any possible medium which can be accessed by the computer. The samples are illustrated but not limited thereto: the computer readable medium can comprise Random Access Memory (RAM), Read-Only Memory (ROM), Electrically Erasable Programmable Read-Only Memory (EEPROM), Compact Disc Read-Only Memory (CD-ROM) or other storage optical Discs, magnetic disc storage medium or other magnetic storage devices, or any other mediums which can carry or store the expected program codes having instructions or data structure forms and can be accessed by the computer. Besides, any computer readable mediums which are properly connected can be illustrated. For instance, if the software is transmitted from the website, server or other remote source through the coaxial cable, fiber optic cable, twisted pair, Digital Subscriber Line (DSL) or the wireless technologies, such as infrared, radio, and microwave, then the coaxial cable, fiber optic cable, twisted pair, Digital Subscriber Line (DSL) or the wireless technologies, such as infrared, radio, and microwave should be included in the definition of the mediums. As used in the present invention, the Disk and the disc comprises the compact disc (CD), laser disc, optical disc, Digital Versatile Disc (DVD), soft disk and blue-ray disc, wherein the disk contains the magnetic copy data, and the disc contains the optical copy data read by laser. The foregoing combinations should be included in the protective scope of the computer readable mediums.

In sum, the previous description is merely the preferred embodiment of the technical solution of the present invention rather than the restriction to the protective scope of the present invention. Any modification, equivalent replacement or improvement within the spirit and principles of the present invention should be included within the protective scope of the present invention.

What is claimed is:
1. A control device of a display panel, comprising a sequence controller and a source driver, wherein the control device further comprises:
  one temperature detection module, employing only one thermal resistor to only detect a temperature of a chip of the source driver, and to generate a notification signal according to the temperature, and to send the notification signal to the sequence controller;
  the sequence controller is employed to obtain the temperature indicated by the notification signal, and to generate a control signal according to the temperature, and to send the control signal to the source driver if the temperature exceeds preset temperature range thresholds;
  the source driver is employed to switch a polarity inversion manner of the display panel according to the control signal to change a power consumption of the chip of the source driver for adjusting the temperature of the chip of the source driver, wherein the polarity inversion manner comprises frame inversion, column inversion, row inversion, two row inversion and dot inversion, wherein as the temperature of the chip of the source driver is too high, the polarity inversion manner with lower power consumption is selected for lowering the temperature of the chip; as the temperature of the chip of the source driver is too low, the polarity inversion manner with higher power consumption is selected for raising the temperature of the chip for keeping the temperature of the chip is maintained between the preset temperature range thresholds.

2. The control device according to claim 1, wherein the preset temperature range thresholds comprises a first temperature threshold and a second temperature threshold, and the first temperature threshold is higher than the second temperature threshold, and that the temperature exceeds the preset temperature range threshold comprises that the temperature is higher than the first temperature threshold and that the temperature is lower than the second temperature threshold.

3. The control device according to claim 2, wherein if the temperature is higher than the first temperature threshold, the sequence controller generates a first control signal according to the temperature;
the source driver switches the polarity inversion manner of the display panel according to the first control signal, wherein a power consumption of the polarity inversion manner after switching is lower than a power consumption of the polarity inversion manner before switching.

4. The control device according to claim 2, wherein if the temperature is lower than the second temperature threshold, the sequence controller generates a second control signal according to the temperature;
the source driver switches the polarity inversion manner of the display panel according to the second control signal, wherein a power consumption of the polarity inversion manner after switching is higher than a power consumption of the polarity inversion manner before switching.

5. The control device according to claim 1, wherein the notification signal is a voltage signal.

6. The control device according to claim 5, wherein the sequence controller analyzes the notification signal to obtain the temperature indicated by the voltage signal in the notification signal.

7. A control method of a display panel, comprising:
employing only one thermal resistor to only detect a temperature of a chip of a source driver of the display panel, and to generate a notification signal according to the temperature;
obtaining a temperature of the notification signal, and generating a control signal according to the temperature if the temperature exceeds preset temperature range thresholds;
switching a polarity inversion manner of the display panel according to the control signal to change a power consumption of the chip of the source driver for adjusting the temperature of the chip of the source driver, wherein the polarity inversion manner comprises frame inversion, column inversion, row inversion, two row inversion and dot inversion, wherein as the temperature of the chip of the source driver is too high, the polarity inversion manner with lower power consumption is selected for lowering the temperature of the chip; as the temperature of the chip of the source driver is too low, the polarity inversion manner with higher power consumption is selected for raising the temperature of the chip for keeping the temperature of the chip is maintained between the preset temperature range thresholds.

8. The control method according to claim 7, wherein the preset temperature range thresholds comprises a first temperature threshold and a second temperature threshold, and the first temperature threshold is higher than the second temperature threshold, and that the temperature exceeds the preset temperature range threshold comprises that the temperature is higher than the first temperature threshold and that the temperature is lower than the second temperature threshold.

9. The control method according to claim 8, wherein if the temperature is higher than the first temperature threshold, the sequence controller generates a first control signal according to the temperature;
switching the polarity inversion manner of the display panel according to the first control signal, wherein a power consumption of the polarity inversion manner after switching is lower than a power consumption of the polarity inversion manner before switching.

10. The control method according to claim 8, wherein if the temperature is lower than the second temperature threshold, the sequence controller generates a second control signal according to the temperature;
switching the polarity inversion manner of the display panel according to the second control signal, wherein a power consumption of the polarity inversion manner after switching is higher than a power consumption of the polarity inversion manner before switching.

11. The control method according to claim 7, wherein the notification signal is a voltage signal.

12. The control method according to claim 11, wherein obtaining the temperature of the notification signal comprises:
analyzing the notification signal to obtain the temperature indicated by the voltage signal in the notification signal.

* * * * *